US009392306B2

(12) United States Patent
Kotecha et al.

(10) Patent No.: US 9,392,306 B2
(45) Date of Patent: Jul. 12, 2016

(54) VIDEO CONTENT DELIVERY OVER WIRELESS ACCESS NETWORKS WITH QUALITY OF SERVICE (QOS) GUARANTEES

(75) Inventors: Lalit Ratilal Kotecha, San Ramon, CA (US); Sergio Aguirre, Southlake, TX (US); Raafat Kamel, Little Falls, NJ (US); Kamlesh Kamdar, Dublin, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 475 days.

(21) Appl. No.: 12/849,916

(22) Filed: Aug. 4, 2010

(65) Prior Publication Data

US 2012/0036541 A1 Feb. 9, 2012

(51) Int. Cl.
| | | |
|---|---|---|
| *H04N 7/173* | (2011.01) | |
| *H04N 7/16* | (2011.01) | |
| *H04N 21/2385* | (2011.01) | |
| *H04N 21/24* | (2011.01) | |
| *H04N 21/61* | (2011.01) | |
| *H04L 29/06* | (2006.01) | |

(52) U.S. Cl.
CPC ........ *H04N 21/2385* (2013.01); *H04L 65/4084* (2013.01); *H04N 21/2402* (2013.01); *H04N 21/6131* (2013.01)

(58) Field of Classification Search
USPC ................................................ 725/62, 93–95
See application file for complete search history.

(56) References Cited

U.S. PATENT DOCUMENTS

| | | | |
|---|---|---|---|
| 6,470,378 B1 * | 10/2002 | Tracton et al. ................ 709/203 |
| 2005/0179607 A1 | 8/2005 | Gorsuch et al. | |
| 2006/0168303 A1 * | 7/2006 | Oyama et al. ................. 709/231 |
| 2007/0173303 A1 | 7/2007 | Viorel et al. | |
| 2010/0115575 A1 * | 5/2010 | Yu et al. ....................... 725/142 |
| 2010/0254370 A1 * | 10/2010 | Jana et al. .................... 370/352 |
| 2010/0311321 A1 | 12/2010 | Norin | |
| 2010/0313232 A1 | 12/2010 | Norin | |

\* cited by examiner

*Primary Examiner* — Hunter B Lonsberry

(57) ABSTRACT

A device receives, from a content provider, traffic parameters associated with a video content request received from a fixed user device connected to a wireless access network, and determines, based on the traffic parameters, a trigger for creating a dedicated bearer for the fixed user device in the wireless access network. The device also provides the trigger to the wireless access network, where the wireless access network creates the dedicated bearer for the fixed user device based on the trigger, and the wireless access network assigns quality of service (QoS) parameters, based on the traffic parameters, to video content delivered to the fixed user device.

4 Claims, 10 Drawing Sheets

VIDEO CONTENT DELIVERY OVER WIRELESS ACCESS NETWORKS WITH QUALITY OF SERVICE (QOS) GUARANTEES

BACKGROUND

As wireless network data rates improve using third generation (3G), fourth generation (4G), and WiFi technologies, more and more bandwidth-intensive applications are being developed. Video over the Internet is becoming a significant part of Internet traffic with video portals provided by content providers, such as Hulu, YouTube, CNN, etc. Video content is also becoming more popular with applications provided via smart phones (e.g., the Motorola DROID, the iPhone, etc.). Much of the video content provided by such content providers and/or applications is high bit rate content that is not optimized for wireless networks. Furthermore, wireless networks may be utilized as a "last mile solution" (e.g., connection between a customer and a telephone company, cable company, and/or service provider) in remote regions (e.g., rural regions) for the delivery of video content, such as television (TV) content (e.g., TV shows, pay-per-view (PPV) content, video-on-demand (VOD) content, etc.).

Wireless service providers have no control over this off-network video content. For example, wireless service providers cannot provide quality of service (QoS) guarantees to such video content. QoS refers to resource reservation control mechanisms that provide different priorities to different applications, users, and/or traffic (e.g., video content), or guarantees a certain level of performance (e.g., a required bit rate, delay, jitter, packet dropping probability, and/or bit error rate (BER) may be guaranteed) to traffic. If content delivery is not optimized for wireless networks, video content may become a choking point for the wireless networks. This may result in poor user experiences and degraded services (e.g., provided by the wireless networks) for other applications like voice-over-Internet protocol (VoIP).

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide QoS guarantees to video content delivered to fixed user devices over wireless access networks. The systems and/or methods may extend policy control capabilities of the wireless access network so that policies for QoS delivery are simplified. In one example implementation, the systems and/or methods may receive a video content request from a fixed user device connected to a Long Term Evolution (LTE) access network, and may provide the video content request to a content provider. The systems and/or methods may receive a trigger for creating a dedicated bearer, in the LTE network, based on traffic parameters associated with the video content request, and may create a dedicated bearer for the fixed user device, in the LTE network, based on the trigger. The systems and/or methods may receive video content from the content provider based on the video content request, may assign or provide QoS parameters to the video content based on the traffic parameters, and may provide, to the user device via the LTE network, the video content with the QoS parameters.

In another implementation, for example, the systems and/or methods may receive subscriber profile information for a fixed user device when the user device connects to a LTE network, and may receive a video content request from the fixed user device. The systems and/or methods may provide the video content request to a content provider, may receive video content from the content provider based on the video content request, and may create a dedicated bearer for the fixed user device when the video content matches the subscriber profile information. The systems and/or methods may assign or provide QoS parameters to the video content based on the subscriber profile information, and may provide, to the user device via the LTE network, the video content with the QoS parameters.

As used herein, the terms "customer," "viewer," "subscriber," and/or "user" may be used interchangeably. Also, the terms "customer," "viewer," "subscriber," and/or "user" are intended to be broadly interpreted to include a user device (e.g., a mobile telephone, a personal computer, a set-top box, a television, etc.) or a user of a user device.

Figure 1:
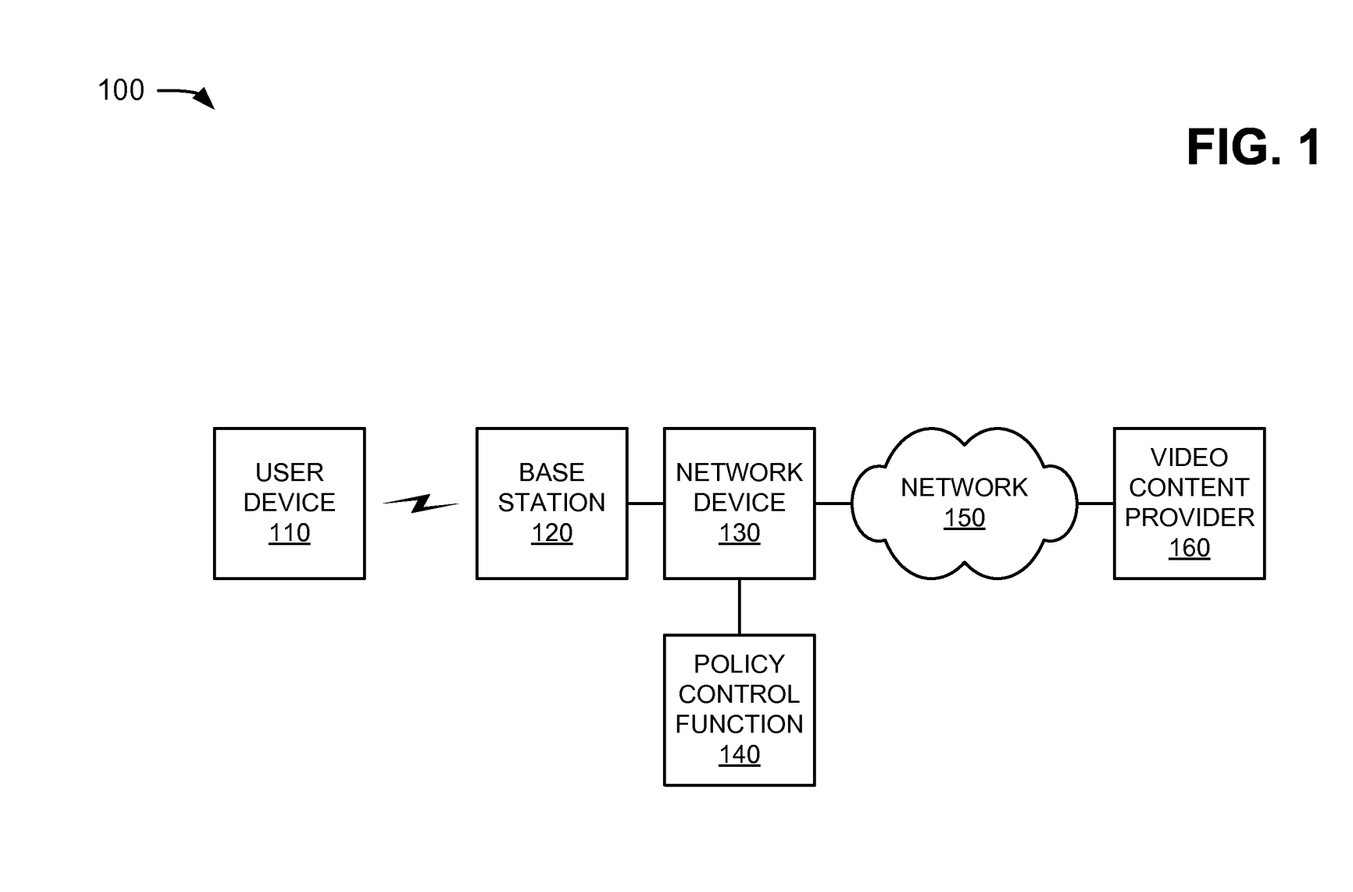
FIG. 1 is a diagram of an example network in which systems and/or methods described herein may be implemented.

FIG. 1 is a diagram of an example network 100 in which systems and/or methods described herein may be implemented. As illustrated, network 100 may include a user device 110, a base station 120, a network device 130, a policy control function 140, a network 150, and a video content provider 160. Components of network 100 may interconnect via wired and/or wireless connections. A single user device 110, base station 120, network device 130, policy control function 140, network 150, and video content provider 160 have been illustrated in FIG. 1 for simplicity. In practice, there may be more user devices 110, base stations 120, network devices 130, policy control functions 140, networks 150, and/or video content providers 160.

User device 110 may include any device that is capable of communicating with video content provider 160 via a wireless network (e.g., provided by base station 120 and/or network device 130). For example, user device 110 may include a mobile computation and/or communication device, such as a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smart phone, a laptop computer (e.g., with a wireless air card), a global positioning system (GPS) device, a content recording device (e.g., a camera, a video camera, etc.), etc. In another example, user device 110 may include a fixed (e.g., provided in a particular location, such as within a customer's home) computation and/or communication device, such as a laptop computer, a personal computer, a tablet computer, a set-top box (STB), a television, a gaming system, etc.

Base station 120 may include one or more computation and/or communication devices that receive voice and/or data (e.g., video content) from video content provider 160 (e.g., via network device 130) and transmit that voice and/or data to user device 110. Base station 120 may also include one or more devices that receive voice and/or data (e.g., a request for video content) from user device 110 and transmit that voice and/or data to video content provider 160 (e.g., via network device 130 and network 150).

Network device 130 may include one or more data transfer devices, such as a gateway, a router, a switch, a firewall, a network interface card (NIC), a hub, a bridge, a proxy server, an optical add-drop multiplexer (OADM), or some other type of device that processes and/or transfers data. In one example, network device 130 may include a mobile wireless gateway that provides a convergence point between wireless protocols (e.g., associated with user device 110 and/or base station 120) and IP protocols (e.g., associated with policy control function 140, network 150, and/or video content provider 160). The mobile wireless gateway may route packets (or portions of packets) from a wireless network (e.g., user device 110 and base station 120) to another network (e.g., network 150). In one implementation, network device 130 may receive requests for video content from user device 110 (e.g., via base station 120), and may provide the requests for video content to video content provider 160. Network device 130 may receive the requested video content from video content provider 160, may apply QoS parameters or guarantees to the video content, and may provide the video content (e.g., with the guaranteed QoS) to user device 110 (e.g., via base station 120). Further details of network device 130 are provided below in connection with one or more of FIGS. 2-5.

In one example, base station 120 and/or network device 130 may provide a wireless access network for user device 110. The wireless access network, in one implementation, may correspond to a LTE network. The LTE network may include a communications network that connects subscribers (e.g., user device 110) to a service provider (e.g., video content provider 160). In another implementation, the wireless access network may include a WiFi network or other access networks (e.g., an enhanced high-rate packet data (eHRPD) network or a WiMax network). In another example, the wireless access network may include a radio access network capable of supporting high data rate, low latency, packet optimization, large capacity and coverage, etc.

Policy control function 140 may include one or more computation or communication devices that may provide policy control decision and flow based charging control functionalities. Policy control function 140 may provide network control regarding service data flow detection, gating, QoS and flow based charging, etc. Policy control function 140 may determine how a certain service data flow shall be treated, and may ensure that user plane traffic mapping and treatment is in accordance with a user's subscription profile. In one implementation, policy control function 140 may receive traffic parameters (e.g., source and destination IP addresses, port over which traffic is carried, protocol over which traffic is carried, average and peak required data rates, etc.) for video content delivery from video content provider 160. Policy control function 140 may trigger creation of a dedicated bearer for user device 110 (e.g., in the LTE network provided by base station 120 and/or network device 130) based on the received traffic parameters. In another implementation, policy control function 140 may receive profile information associated with video content subscribers (e.g., users of user devices 110), and may provide profile information for a particular subscriber to network device 130 when the particular subscriber attaches to the LTE network (e.g., provided by base station 120 and/or network device 130). Further details of policy control function 140 are provided below in connection with one or more of FIGS. 2-4 and 6.

Network 150 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks.

Video content provider 160 may include one or more server devices, or other types of computation or communication devices, that gather, process, search, and/or provide information in a manner described herein. In one implementation, video content provider 160 may include a computer system, an application, a cable head-end, and/or a broadcasting device capable of providing video content (e.g., VOD content, high definition (HD)-VOD content, TV programming, movies, on-demand services, live television, etc.), commercials, advertisements, instructions, and/or other information.

Although FIG. 1 shows example components of network 100, in other implementations, network 100 may contain fewer components, different components, differently arranged components, and/or additional components than those depicted in FIG. 1. Alternatively, or additionally, one or more components of network 100 may perform one or more other tasks described as being performed by one or more other components of network 100.

Figure 2:
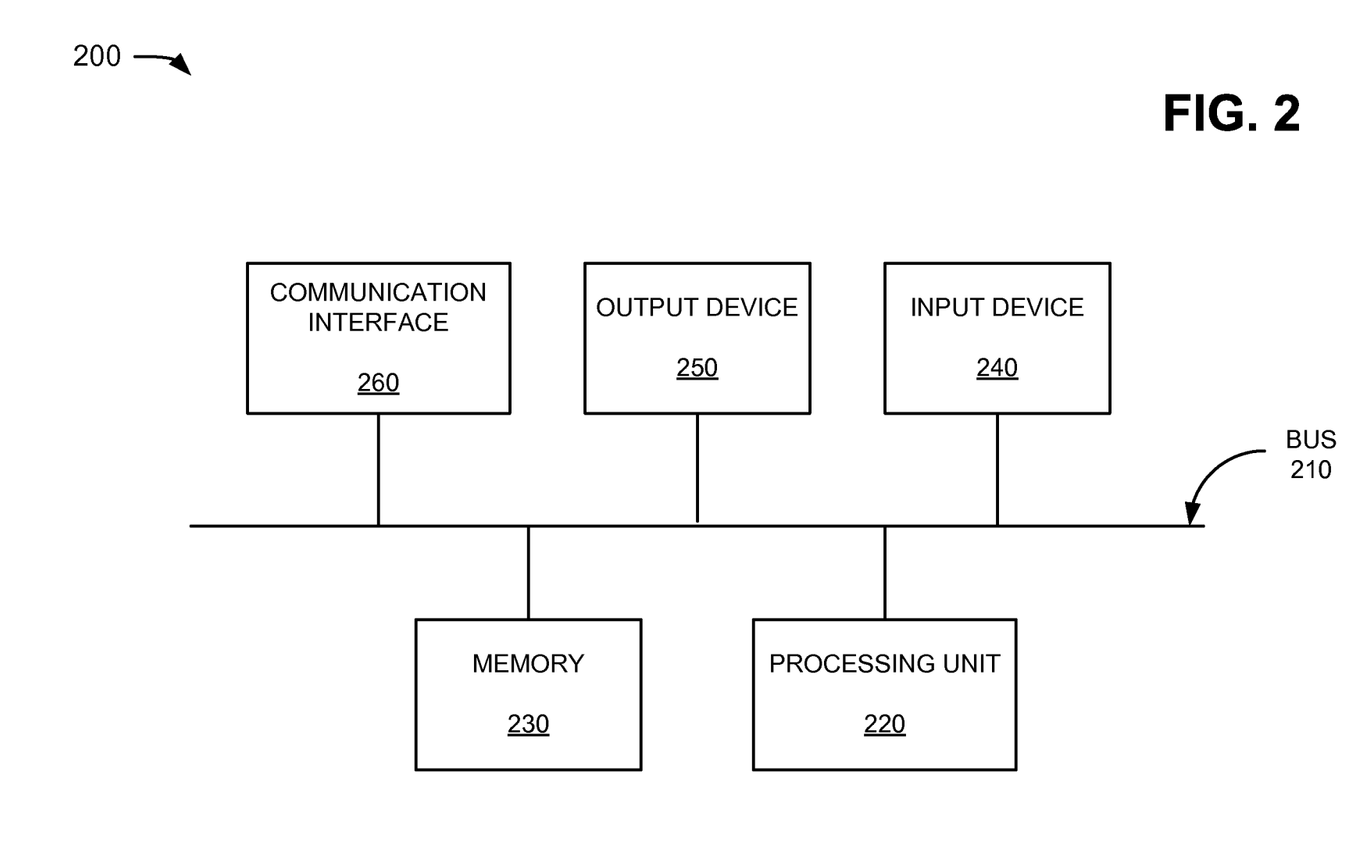
FIG. 2 is a diagram of example components of one or more of the devices of the network depicted in FIG. 1.

FIG. 2 is a diagram of example components of a device 200 that may correspond to one of the devices of network 100. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 360 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a physical or logical memory device. A logical memory device may include memory space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more other tasks described as being performed by one or more other components of device 200.

Figure 3:
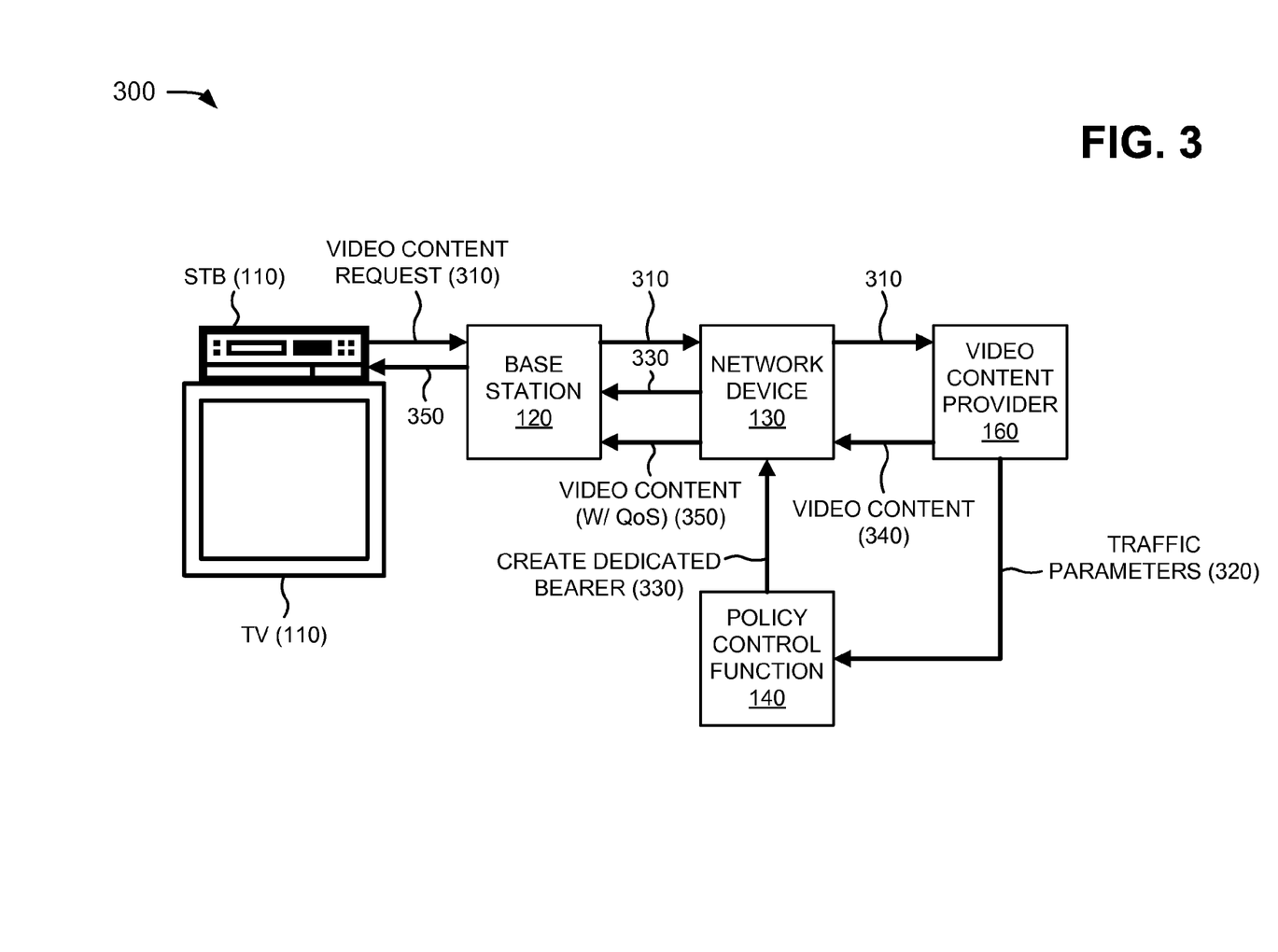
FIG. 3 is a diagram of example interactions between components of an example portion of the network illustrated in FIG. 1.

FIG. 3 is a diagram of example interactions between components of an example portion 300 of network 100. As illustrated, example network portion 300 may include user device 110, base station 120, network device 130, policy control function 140, and video content provider 160. User device 110, base station 120, network device 130, policy control function 140, and video content provider 160 may include the features described above in connection with one or more of FIGS. 1 and 2. Furthermore, user device 110 depicted in FIG. 3 may correspond to a fixed user device, such as a television (TV) 110 associated with a set-top box (STB) 110.

Television 110 may include a television monitor that is capable of displaying video content, television programming, content provided by STB 110, and/or content provided by other devices (e.g., a digital video disk (DVD) player, a video camera, etc., not shown) connected to television 110.

STB 110 may include a device that receives video content (e.g., from video content provider 160), and provides the video content to television 110 or another device. STB 110 may record video content in a digital format to a disk drive or other memory medium within STB 110. In one example implementation, STB 110 may be incorporated directly within television 110 and/or may include a digital video recorder (DVR). In another implementation, television/STB 110 may be replaced with a computing device, such as a personal computer, a laptop computer, a tablet computer, etc.

In one example implementation, user device 110 (e.g., STB 110) may connect to an outdoor broadband unit (not shown) that enables user device 110 to wirelessly communicate with base station 120. The outdoor broadband unit may include a radio frequency (RF) antenna and a LTE module. The RF antenna may include an antenna to transmit and/or receive RF signals over the air. The RF antenna may, for example, receive RF signals from the LTE module and transmit the RF signals over the air. Also, the RF antenna may, for example, receive RF signals over the air and provide them to the LTE module. In one implementation, for example, the LTE module may communicate with base station 120 to send and/or receive signals from user device 110. The LTE module may include communication capability via an air interface. For example, the LTE module may receive broadband signals and/or VoIP signals from base station 120 (e.g., via the RF antenna) and may transmit broadband signals and/or VoIP signals to base station 120 (e.g., via the RF antenna). The LTE module may employ frequency division duplex (FDD) and/or time division duplex (TDD) techniques to facilitate downlink and uplink transmissions.

As further shown in FIG. 3, a user (not shown) may utilize user device 110 to generate a request 310 for video content to be displayed on user device 110. For example, the user may be viewing a menu of VOD content (e.g., via user device 110), and may select a video provided by the menu. User device 110 may wirelessly provide video content request 310 to base station 120, and base station 120 may forward video content request 310 to network device 130. Network device 130 may forward video content request 310 to video content provider 160 (e.g., via network 150, not shown). Video content provider 160 may receive video content request 310 from network device 130, and may interact with policy control function 140 to deliver traffic parameters 320 associated with the video content requested by video content request 310 (e.g., prior to providing the video content to user device 110). For example, video content provider 160 may provide, to policy control function 140, traffic parameters 320, such as source and/or destination IP addresses over which the video content will be delivered; a port over which the video content will be delivered; a protocol (e.g., a transmission control protocol (TCP), a user datagram protocol (UDP), a real-time transport protocol (RTP), etc.) over which the video content will be carried; average and peak data rates associated with the video content; etc.

Policy control function 140 may receive traffic parameters 320, and may trigger creation of a dedicated bearer (e.g., based on traffic parameters 320) for user device 110 in the wireless access network provided by base station 120 and/or network device 130, as indicated by reference number 330. Video content provider 160 may search for the requested video content (e.g., provided via video content request 310), and may provide the requested video content 340 to network device 130. After creation of the dedicated bearer for user device 110, network device 130 may assign or provide QoS parameters or guarantees (e.g., based on traffic parameters 320) to video content 340 in order to create video content (e.g., with the QoS guarantees) 350. For example, network device 130 may provide QoS that guarantees a certain level of performance (e.g., a required bit rate, delay, jitter, packet dropping probability, and/or BER may be guaranteed) for video content 340. In another example, as packets associated with video content 340 arrive at network device 130, network device 130 may mark the packets with QoS parameters.

As further shown in FIG. 3, network device 130 may provide video content (e.g., with the QoS guarantees) 350 to base station 120. Base station 120 may provide similar QoS treatment to video content 350 as provided by network device 130 (e.g., as described above), and may guarantee an average data rate to video content 350. Base station 120 may provide video content (e.g., with the QoS guarantees) 350 to user device 110 (e.g., to STB 110). User device 110 may receive video content 350 and may display video content 350 to the user (e.g., via television 110).

Although FIG. 3 shows example components of network portion 300, in other implementations, network portion 300 may contain fewer components, different components, differently arranged components, and/or additional components than depicted in FIG. 3. Alternatively, or additionally, one or more components of network portion 300 may perform one or more other tasks described as being performed by one or more other components of network portion 300.

Figure 4:
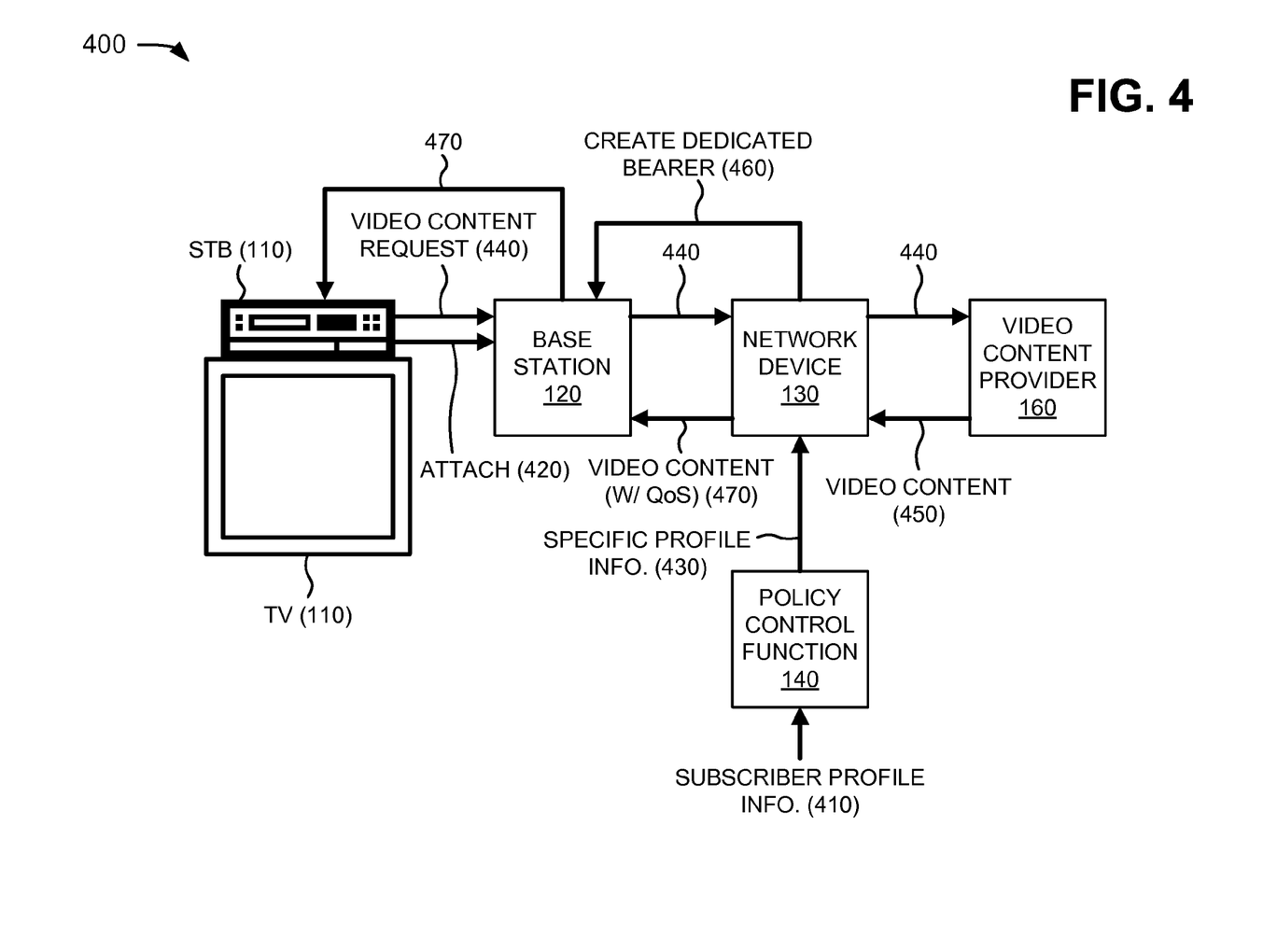
FIG. 4 is a diagram of example interactions between components of another example portion of the network illustrated in FIG. 1.

FIG. 4 is a diagram of example interactions between components of another example portion 400 of network 100. As illustrated, example network portion 400 may include user device 110, base station 120, network device 130, policy control function 140, and video content provider 160. User device 110, base station 120, network device 130, policy control function 140, and video content provider 160 may include the features described above in connection with one or more of FIGS. 1-3. Furthermore, user device 110 depicted in FIG. 4 may correspond to a fixed user device, such as a television (TV) 110 associated with a STB 110. Television 110 and STB 110 may include the features described above in connection with FIG. 3.

As shown in FIG. 4, subscriber profile information 410 may be pre-provisioned in policy control function 140 (e.g., by video content provider 160 and/or other sources). Subscriber profile information 410 may include information associated with subscribers (e.g., users of user devices 110) of video content provider 160. For example, subscriber profile information 410 may include traffic parameters 320 (e.g., source and/or destination IP addresses over which video content will be delivered, a port over which video content will be delivered, a protocol over which video content will be carried, average and peak data rates associated with video content, etc.) associated with subscribers of video content provider 160.

As further shown in FIG. 4, a user (not shown) may utilize user device 110 (e.g., STB 110) to attach to the wireless access network (e.g., provided by base station 120 and/or network device 130), as indicated by reference number 420. When the user (e.g., via STB 110) attaches to the wireless access network, policy control function 140 may be instructed (e.g., by network device 130) to provide profile information 430 for the specific user to network device 130. Specific profile information 430 may include traffic parameters 320 (e.g., source and/or destination IP addresses over which video content will be delivered, a port over which video content will be delivered, a protocol over which video content will be carried, average and peak data rates associated with video content, etc.) associated with the user of user device 110.

The user may also utilize user device 110 (e.g., STB 110) to generate a request 440 for video content to be displayed on user device 110. For example, the user may be viewing a menu of pay-per-view content (e.g., via user device 110), and may select a video provided by the menu. User device 110 may wirelessly provide video content request 440 to base station 120, and base station 120 may forward video content request 440 to network device 130. Network device 130 may forward video content request 440 to video content provider 160 (e.g., via network 150, not shown). Video content provider 160 may receive video content request 440 from network device 130, may search for the requested video content (e.g., provided via video content request 440), and may provide the requested video content 450 to network device 130.

Network device 130 may receive video content 450 (e.g., packets of video content 450), and may determine whether packets of video content 450 match specific profile information 430 received from policy control function 140. When network device 130 detects a packet of video content 450 (e.g., as video content 450 is received) that matches specific profile information 430, network device 130 may trigger creation of a dedicated bearer (e.g., based on specific profile information 430) for user device 110 in the wireless access network provided by base station 120 and/or network device 130, as indicated by reference number 460. The dedicated bearer may be created quickly (e.g., in a fraction of a second), and packets of video content 450 arriving at network device 130 may be queued until the dedicated bearer is created. If network device 130 fails to detect a packet of video content 450 that matches specific profile information 430, network device 130 may optimize resources by not creating the dedicated bearer.

After creation of the dedicated bearer for user device 110, network device 130 may assign or provide QoS parameters or guarantees (e.g., based on specific profile information 430) to video content 450 (e.g., to new packets and to queued packets of video content 450) in order to create video content (e.g., with the QoS guarantees) 470. For example, network device 130 may provide QoS that guarantees a certain level of performance (e.g., a required bit rate, delay, jitter, packet dropping probability, and/or BER may be guaranteed) for video content 450. In another example, as packets associated with video content 450 arrive at network device 130, network device 130 may mark the packets with QoS parameters.

As further shown in FIG. 4, network device 130 may provide video content (e.g., with the QoS guarantees) 470 to base station 120. Base station 120 may provide similar QoS treatment to video content 470 as provided by network device 130 (e.g., as described above), and may guarantee an average data rate to video content 470. Base station 120 may provide video content (e.g., with the QoS guarantees) 470 to user device 110 (e.g., to STB 110). User device 110 may receive video content 470 and may display video content 470 to the user (e.g., via television 110).

Although FIG. 4 shows example components of network portion 400, in other implementations, network portion 400 may contain fewer components, different components, differently arranged components, and/or additional components than depicted in FIG. 4. Alternatively, or additionally, one or more components of network portion 400 may perform one or more other tasks described as being performed by one or more other components of network portion 400.

Figure 5:
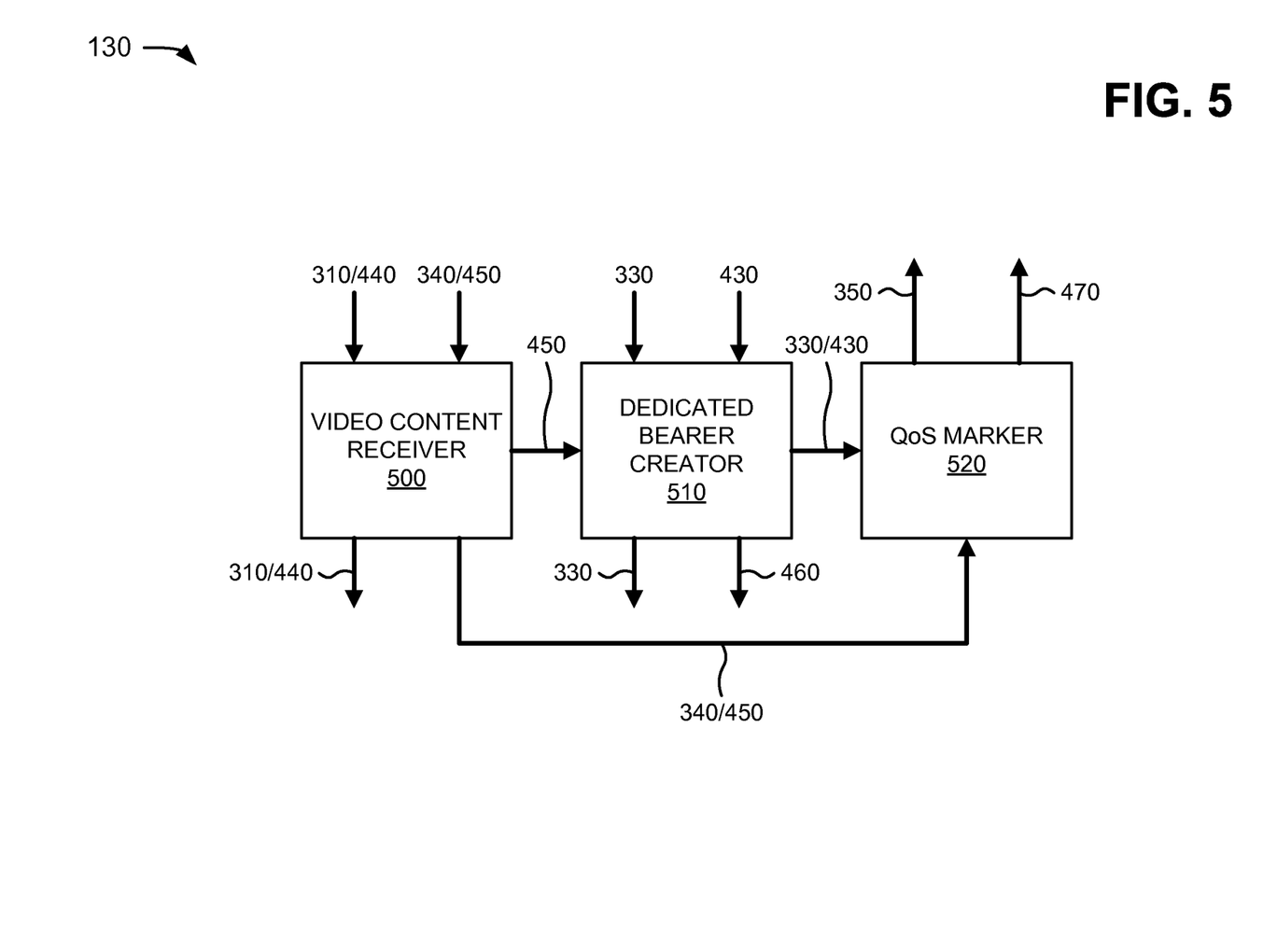
FIG. 5 is a diagram of example functional components of a network device depicted in FIG. 1.

FIG. 5 is a diagram of example functional components of network device 130. In one implementation, the functions described in connection with FIG. 5 may be performed by one or more components of device 200 (FIG. 2). As shown in FIG. 5, network device 130 may include a video content receiver 500, a dedicated bearer creator 510, and a QoS marker 520.

Video content receiver 500 may include hardware or a combination of hardware and software that may receive video content request 310 and/or video content request 440 from user device 110, and may forward video content requests 310/440 to video content provider 160 (e.g., via network 150). Video content receiver 500 may also receive video content 340 and/or video content 450 from video content provider 160, may provide video content 340/450 to QoS marker 520, and may provide video content 450 to dedicated bearer creator 510.

Dedicated bearer creator 510 may include hardware or a combination of hardware and software that may receive trigger 330 to create a dedicated bearer (e.g., based on traffic parameters 320 provided via trigger 330) for user device 110 in the wireless access network provided by base station 120 and/or network device 130. Dedicated bearer creator 510 may provide trigger 330 to base station 120 so that base station 120 may create the dedicated bearer for user device 110. As further shown in FIG. 5, dedicated bearer creator 510 may receive specific profile information 430 from policy control function 140 and video content 450 from video content provider 160, and may determine whether packets of video content 450 match specific profile information 430. When dedicated bearer creator 510 detects a packet of video content 450 that matches specific profile information 430, dedicated bearer creator 510 may trigger creation of a dedicated bearer (e.g., based on specific profile information 430) for user device 110 in the wireless access network provided by base station 120 and/or network device 130, as indicated by reference number 460. Dedicated bearer creator 510 may provide trigger 330 and specific profile information 430 to QoS marker 520.

QoS marker 520 may include hardware or a combination of hardware and software that may receive trigger 330 and/or specific profile information 430 from dedicated bearer creator 510, and may receive video content 340/450 from video content receiver 500. In one example, QoS marker 520 may assign or provide QoS parameters or guarantees (e.g., based on traffic parameters 320 provided via trigger 330) to video content 340 in order to create video content (e.g., with the QoS guarantees) 350. QoS marker 520 may provide video content (e.g., with the QoS guarantees) 350 to base station 120. In another example, QoS marker 520 may assign or provide QoS parameters or guarantees (e.g., based on specific profile information 430) to video content 450 (e.g., to new packets and to queued packets of video content 450) in order to create video content (e.g., with the QoS guarantees) 470. QoS marker 520 may provide video content (e.g., with the QoS guarantees) 470 to base station 120.

Although FIG. 5 shows example functional components of network device 130, in other implementations, network device 130 may contain fewer functional components, different functional components, differently arranged functional components, and/or additional functional components than depicted in FIG. 5. Alternatively, or additionally, one or more functional components of network device 130 may perform one or more other tasks described as being performed by one or more other functional components of network device 130.

Figure 6:
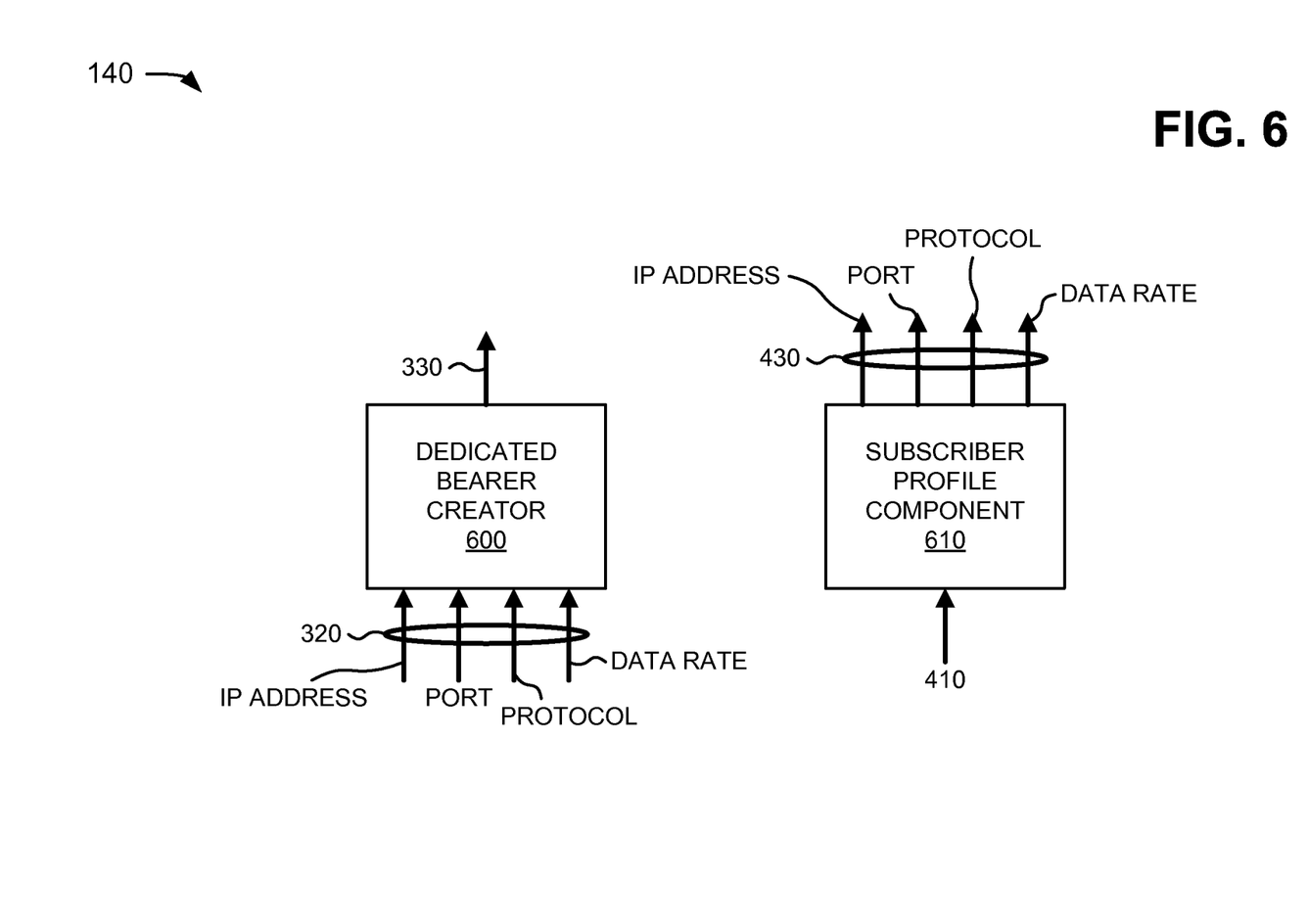
FIG. 6 is a diagram of example functional components of a policy control function device depicted in FIG. 1.

FIG. 6 is a diagram of example functional components of policy control function 140. In one implementation, the functions described in connection with FIG. 6 may be performed by one or more components of device 200 (FIG. 2). As shown in FIG. 6, policy control function 140 may include a dedicated bearer creator 600 and a subscriber profile component 610.

Dedicated bearer creator 600 may include hardware or a combination of hardware and software that may receive traffic parameters 320 from video content provider 160. Traffic parameters 320 may include address information (e.g., source and/or destination IP addresses over which video content will be delivered); port information (e.g., a port over which video content will be delivered); protocol information (e.g., a protocol, such as TCP, UDP, RTP, etc., over which video content will be carried); and data rate information (e.g., average and peak data rates associated with video content). As further shown in FIG. 6, dedicated bearer creator 600 may generate trigger 330 for creating a dedicated bearer (e.g., based on traffic parameters 320) for user device 110 in the wireless access network provided by base station 120 and/or network device 130. Dedicated bearer creator 600 may provide trigger 330 to network device 130.

Subscriber profile component 610 may include hardware or a combination of hardware and software that may receive subscriber profile information 410 from, for example, video content provider 160. When a specific user (e.g., via user device 110) attaches to the wireless access network, subscriber profile component 610 may provide profile information 430 for the specific user to network device 130. As shown in FIG. 6, specific profile information 430 may include address information (e.g., source and/or destination IP addresses over which video content will be delivered); port information (e.g., a port over which video content will be delivered); protocol information (e.g., a protocol, such as TCP, UDP, RTP, etc., over which video content will be carried); and data rate information (e.g., average and peak data rates associated with video content) associated with the user of user device 110.

Although FIG. 6 shows example functional components of policy control function 140, in other implementations, policy control function 140 may contain fewer functional components, different functional components, differently arranged functional components, and/or additional functional components than depicted in FIG. 6. Alternatively, or additionally, one or more functional components of policy control function 140 may perform one or more other tasks described as being performed by one or more other functional components of policy control function 140.

FIGS. 7-10 are flow charts of example processes 700-1000 for providing QoS guarantees to video content delivered to fixed user devices over wireless access networks according to implementations described herein. In one implementation, processes 700 and 800 may be performed by policy control function 140. In another implementation, some or all of processes 700 and 800 may be performed by another device or group of devices, including or excluding policy control function 140. In one implementation, processes 900 and 1000 may be performed by network device 130. In another implementation, some or all of processes 900 and 1000 may be performed by another device or group of devices, including or excluding network device 130.

Figure 7:
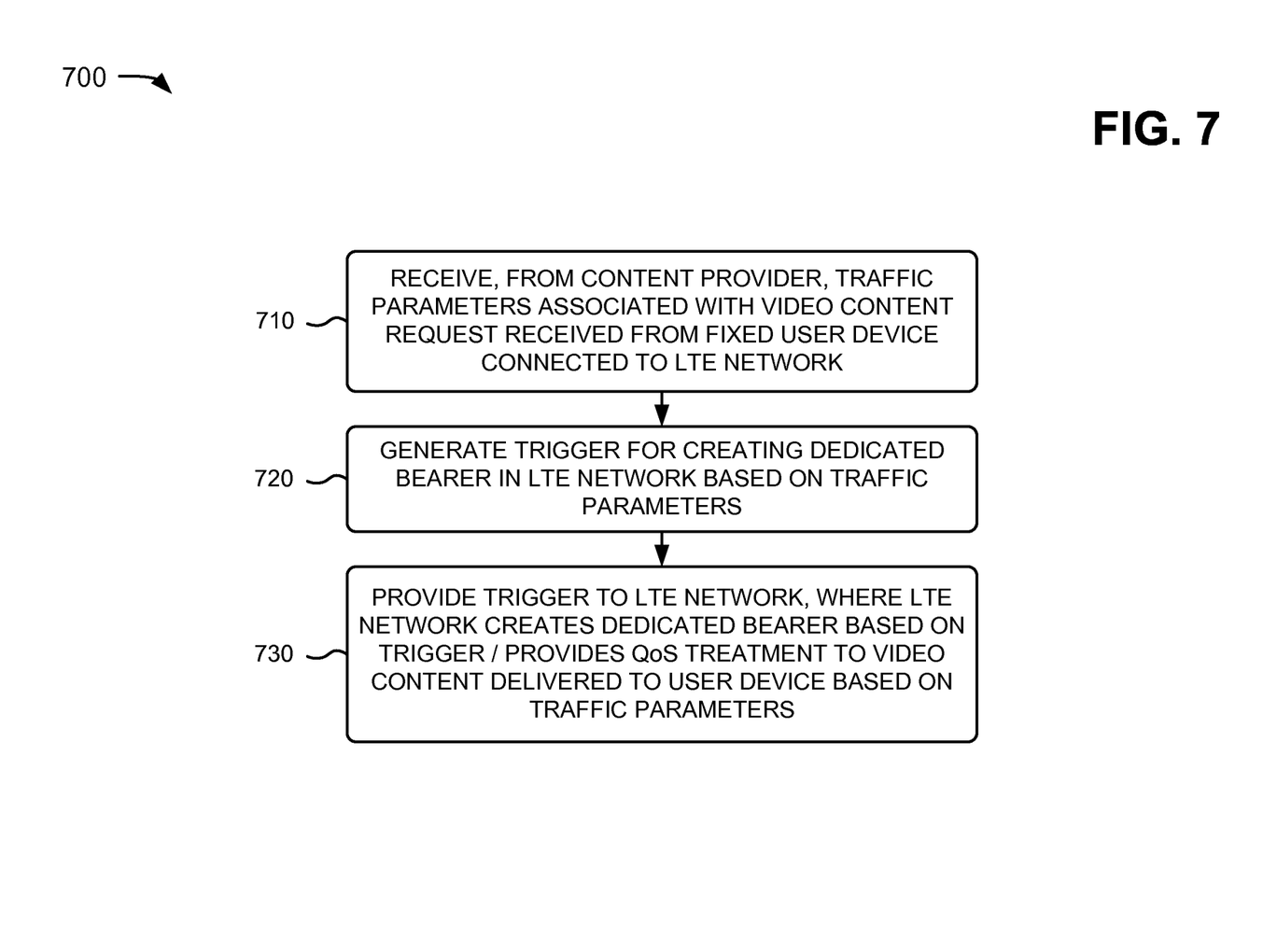
FIGS. 7-10 are flow charts of example processes for providing QoS guarantees to video content delivered to fixed user devices over wireless access networks according to implementations described herein.

As illustrated in FIG. 7, process 700 may include receiving, from a content provider, traffic parameters associated with a video content request received from a fixed user device connected to a LTE network (block 710), and generating a trigger for creating a dedicated bearer in the LTE network based on the traffic parameters (block 720). For example, in implementations described above in connection with FIGS. 3 and 6, video content provider 160 may interact with policy control function 140 to deliver traffic parameters 320 associated with the video content requested by video content request 310 (e.g., prior to providing the video content to user device 110). In one example, video content provider 160 may provide, to policy control function 140, traffic parameters 320, such as source and/or destination IP addresses over which the video content will be delivered; a port over which the video content will be delivered; a protocol (e.g., a TCP, a UDP, a RTP, etc.) over which the video content will be carried; average and peak data rates associated with the video content; etc. Policy control function 140 may receive traffic parameters 320, and dedicated bearer creator 600 of policy control function 140 may generate trigger 330 for creating a dedicated bearer (e.g., based on traffic parameters 320) for user device 110 in the wireless access network (e.g., provided by base station 120 and/or network device 130).

As further shown in FIG. 7, process 700 may include providing the trigger to the LTE network, where the LTE network creates the dedicated bearer for the user device based on the trigger and provides QoS treatment to video content delivered to the user device based on the traffic parameters (block 730). For example, in implementations described above in connection with FIG. 3, policy control function 140 may trigger creation of a dedicated bearer (e.g., based on traffic parameters 320) for user device 110 in the wireless access network provided by base station 120 and/or network device 130, as indicated by reference number 330. After creation of the dedicated bearer for user device 110, network device 130 may assign or provide QoS parameters or guarantees (e.g., based on traffic parameters 320) to video content 340 in order to create video content (e.g., with the QoS guarantees) 350. In one example, network device 130 may provide QoS that guarantees a certain level of performance (e.g., a required bit rate, delay, jitter, packet dropping probability, and/or BER may be guaranteed) for video content 340.

Figure 8:
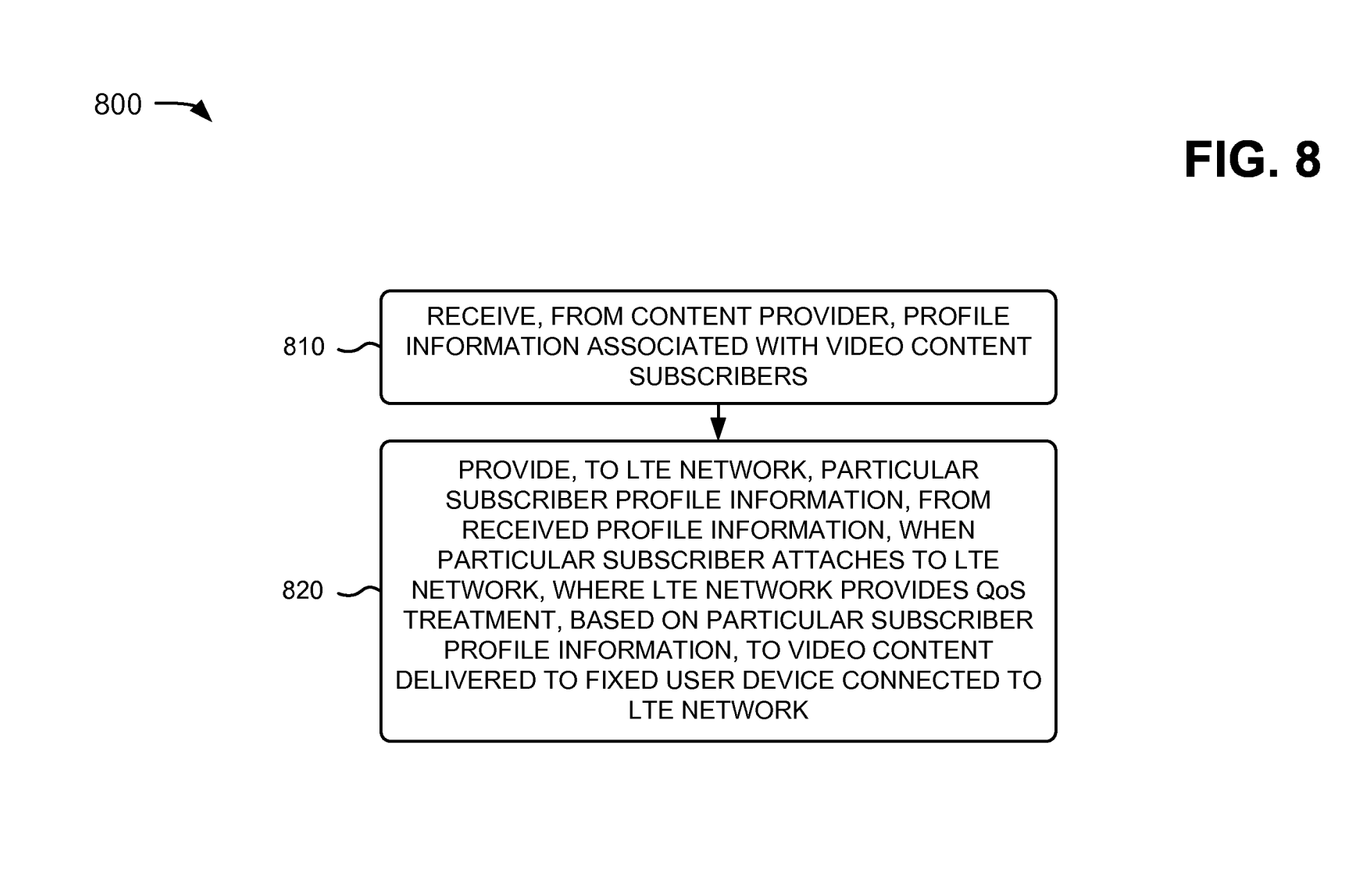

As illustrated in FIG. 8, process 800 may include receiving, from a content provider, profile information associated with video content subscribers (block 810). For example, in implementations described above in connection with FIG. 4, subscriber profile information 410 may be pre-provisioned in policy control function 140 (e.g., by video content provider 160 and/or other sources). Subscriber profile information 410 may include information associated with subscribers (e.g., users of user devices 110) of video content provider 160. In one example, subscriber profile information 410 may include traffic parameters 320 (e.g., source and/or destination IP addresses over which the video content will be delivered, a port over which the video content will be delivered, a protocol over which the video content will be carried, average and peak data rates associated with the video content, etc.) associated with subscribers of video content provider 160.

As further shown in FIG. 8, process 800 may include providing, to a LTE network, particular subscriber information, from the received profile information, when a particular subscriber attaches to the LTE network, where the LTE network provides QoS treatment, based on the particular subscriber profile information, to video content delivered to a fixed user device connected to the LTE network (block 820). For example, in implementations described above in connection with FIG. 4, when the user (e.g., via STB 110) attaches to the wireless access network, profile information 430 for the specific user may be provided by policy control function 140 to network device 130. Specific profile information 430 may include traffic parameters 320 associated with the user of user device 110. Video content provider 160 may receive video content request 440 generated by user device 110, may search for the requested video content (e.g., provided via video content request 440), and may provide the requested video content 450 to network device 130. When network device 130 detects a packet of video content 450 that matches specific profile information 430, network device 130 may trigger creation of a dedicated bearer (e.g., based on specific profile information 430) for user device 110 in the wireless access network provided by base station 120 and/or network device 130. After creation of the dedicated bearer for user device 110, network device 130 may assign or provide QoS parameters or guarantees (e.g., based on specific profile information 430) to video content 450 (e.g., to new packets and to queued packets of video content 450) in order to create video content (e.g., with the QoS guarantees) 470. Network device 130 may provide video content (e.g., with the QoS guarantees) 470 to base station 120, and base station 120 may provide video content (e.g., with the QoS guarantees) 470 to user device 110 (e.g., to STB 110).

Figure 9:
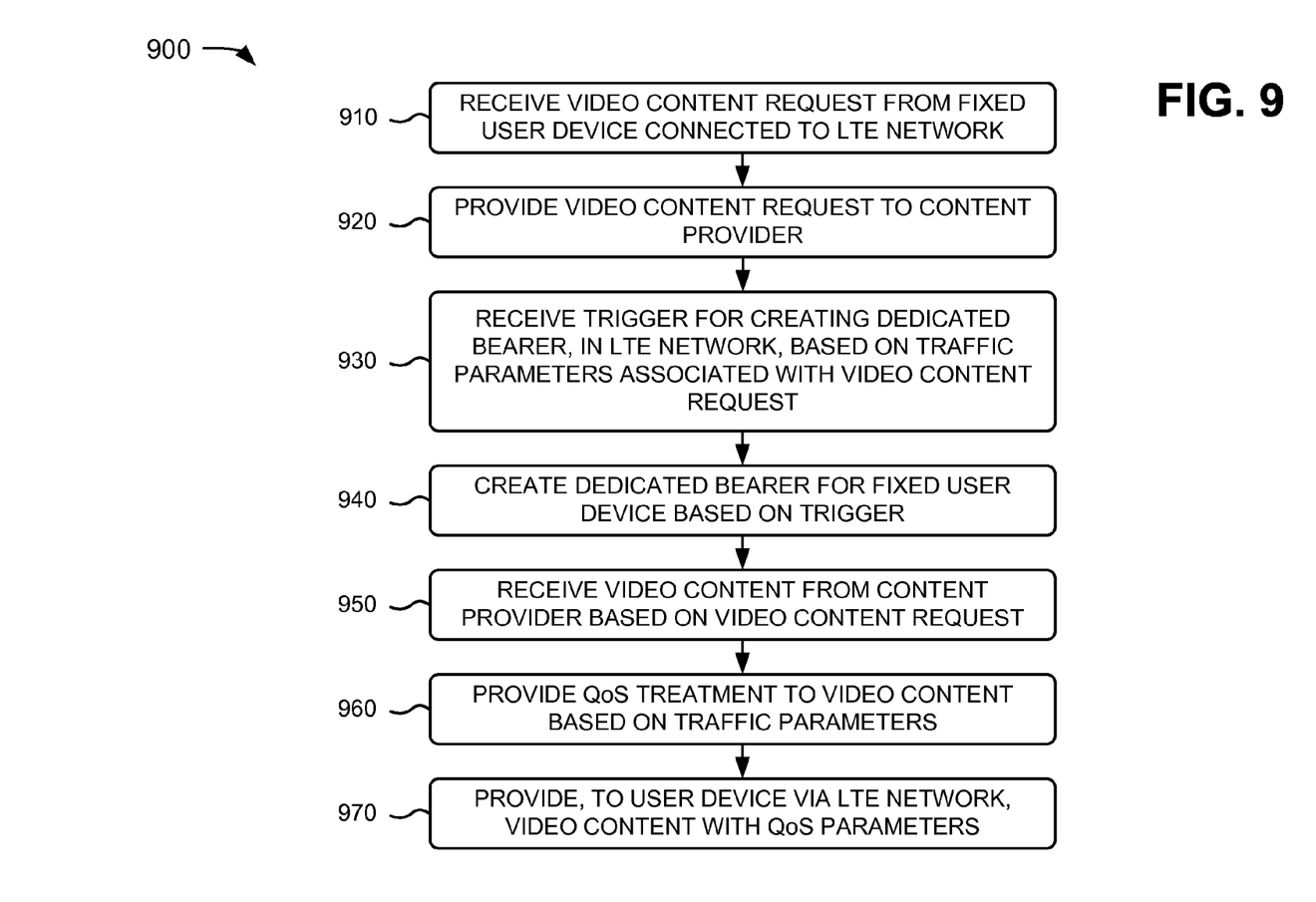

As illustrated in FIG. 9, process 900 may include receiving a video content request from a fixed user device connected to a LTE network (block 910), and providing the video content request to a content provider (block 920). For example, in implementations described above in connection with FIG. 3, a user (not shown) may utilize user device 110 to generate request 310 for video content to be displayed on user device 110. User device 110 may wirelessly provide video content request 310 to base station 120, and base station 120 may forward video content request 310 to network device 130. Network device 130 may forward video content request 310 to video content provider 160 (e.g., via network 150, not shown).

As further shown in FIG. 9, process 900 may include receiving a trigger for creating a dedicated bearer for the user device, in the LTE network, based on traffic parameters associated with the video content request (block 930), and creating the dedicated bearer for the user device based on the trigger (block 940). For example, in implementations described above in connection with FIG. 5, dedicated bearer creator 510 of network device 130 may receive trigger 330 to create a dedicated bearer (e.g., based on traffic parameters 320 provided via trigger 330) for user device 110 in the wireless access network provided by base station 120 and/or network device 130. Dedicated bearer creator 510 may provide trigger 330 to base station 120 so that base station 120 may create the dedicated bearer for user device 110.

Returning to FIG. 9, process 900 may include receiving video content from the content provider based on the video content request (block 950), providing QoS treatment to the video content based on the traffic parameters (block 960), and providing, to the user device via the LTE network, the video content with the QoS parameters (block 970). For example, in implementations described above in connection with FIG. 3, video content provider 160 may search for the requested video content (e.g., provided via video content request 310), and may provide the requested video content 340 to network device 130. After creation of the dedicated bearer for user device 110, network device 130 may assign or provide QoS parameters or guarantees (e.g., based on traffic parameters 320) to video content 340 in order to create video content (e.g., with the QoS guarantees) 350. Network device 130 may provide video content (e.g., with the QoS guarantees) 350 to base station 120, and base station 120 may provide video content (e.g., with the QoS guarantees) 350 to user device 110 (e.g., to STB 110).

Figure 10:
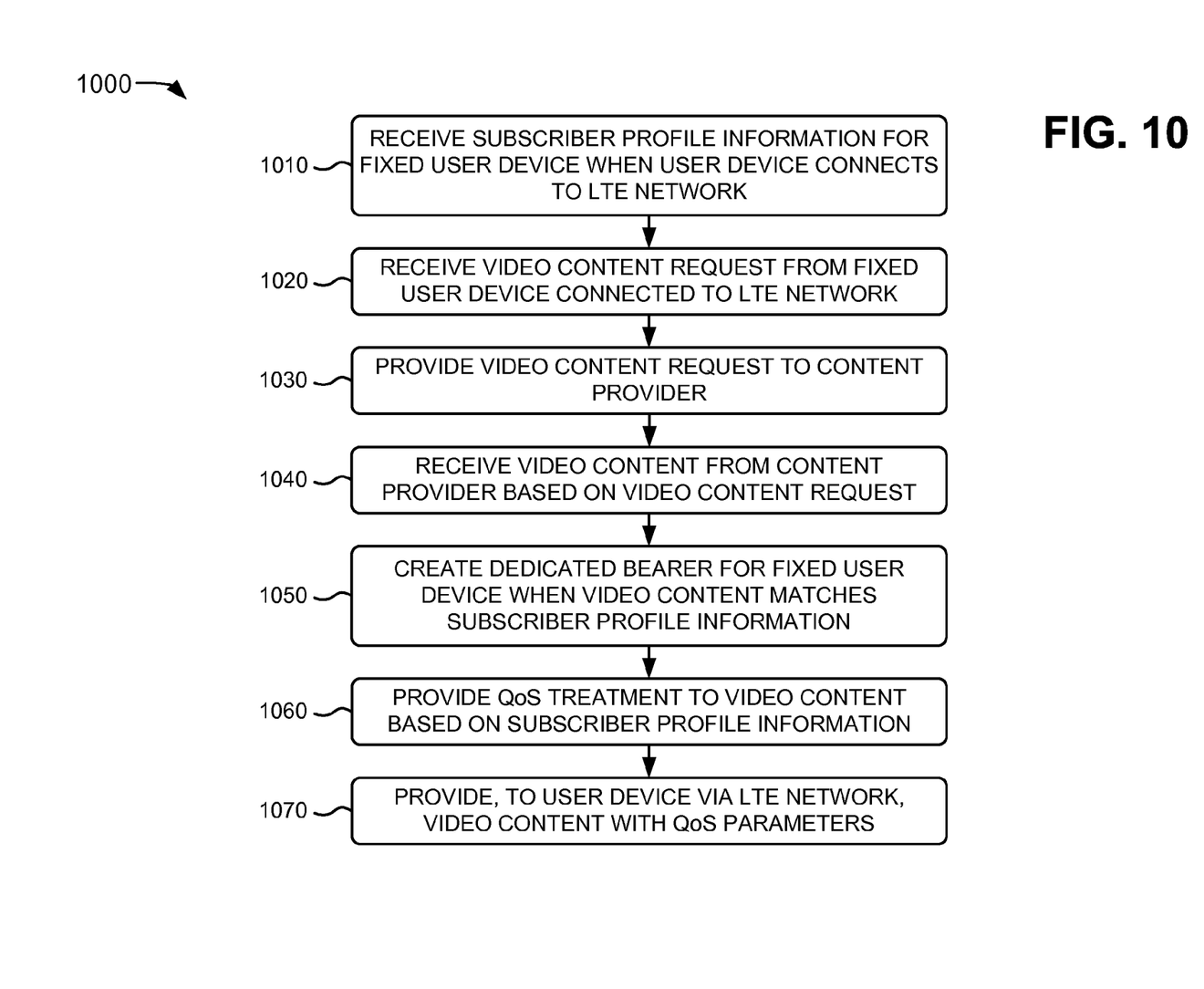

As illustrated in FIG. 10, process 1000 may include receiving subscriber profile information for a fixed user device when the user device connects to a LTE network (block 1010), receiving a video content request from the fixed user device connected to the LTE network (block 1020), and providing the video content request to a content provider (block 1030). For example, in implementations described above in connection with FIG. 4, when the user (e.g., via STB 110) attaches to the wireless access network, profile information 430 for the specific user may be provided by policy control function 140 to network device 130. The user may also utilize user device 110 (e.g., STB 110) to generate request 440 for video content to be displayed on user device 110. User device 110 may wirelessly provide video content request 440 to base station 120, and base station 120 may forward video content request 440 to network device 130. Network device 130 may forward video content request 440 to video content provider 160 (e.g., via network 150, not shown).

As further shown in FIG. 10, process 1000 may include receiving video content from the content provider based on the video content request (block 1040), and creating a dedicated bearer for the user device when the video content matches the subscriber profile information (block 1050). For example, in implementations described above in connection with FIG. 4, network device 130 may receive video content 450 (e.g., packets of video content 450), and may determine whether packets of video content 450 match specific profile information 430 received from policy control function 140. When network device 130 detects a packet of video content 450 that matches specific profile information 430, network device 130 may trigger creation of a dedicated bearer (e.g., based on specific profile information 430) for user device 110 in the wireless access network provided by base station 120 and/or network device 130, as indicated by reference number 460.

Returning to FIG. 10, process 1000 may include providing QoS treatment to the video content based on the subscriber profile information (block 1060), and providing, to the user device via the LTE network, the video content with the QoS parameters (block 1070). For example, in implementations described above in connection with FIG. 4, after creation of the dedicated bearer for user device 110, network device 130 may assign or provide QoS parameters or guarantees (e.g., based on specific profile information 430) to video content 450 (e.g., to new packets and to queued packets of video content 450) in order to create video content (e.g., with the QoS guarantees) 470. Network device 130 may provide video content (e.g., with the QoS guarantees) 470 to base station 120, and base station 120 may provide video content (e.g., with the QoS guarantees) 470 to user device 110 (e.g., to STB 110).

Systems and/or methods described herein may provide QoS guarantees to video content delivered to fixed user devices over wireless access networks. The systems and/or methods may extend policy control capabilities of the wireless access network so that policies for QoS delivery are simplified.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7-10, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" that performs one or more functions. These components may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a computing device, the method comprising:
  receiving, by the computing device, subscriber profile information for a fixed user device when the fixed user device connects to a wireless access network;
  receiving, by the computing device, a video content request from the fixed user device connected to the wireless access network;
  providing, by the computing device, the video content request to a content provider;
  receiving, by the computing device, video content from the content provider based on the video content request;
  creating, by the computing device, a dedicated bearer, for the fixed user device in the wireless access network, when the video content matches the subscriber profile information; and
  assigning, by the computing device and when the dedicated bearer is created, quality of service (QoS) parameters to the video content based on the traffic parameters, wherein creating a dedicated bearer comprises:
  determining whether a packet of the video content matches the subscriber profile information,
  triggering creation of the dedicated bearer for the fixed user device when a packet of the video content matches the specific profile information, and
  providing, in a queue, packets of the video content arriving at the computing device until the dedicated bearer is created for the fixed user device, and
  preventing creation of the dedicated bearer for the fixed user device when a packet of the video content fails to match the subscriber profile information.

2. A method implemented by a computing device, the method comprising:
  receiving, by the computing device and from a content provider, profile information associated with video content subscribers of the content provider; and
  providing, by the computing device and to a wireless access network, particular subscriber profile information, from the received profile information, when a particular subscriber associated with a fixed user device connects to the wireless access network,
  creating, by the computing device, when a match occurs between the profile information, associate with the video content subscribers and the particular subscriber profile information, a dedicated bearer, and
  preventing, by the computing device, when the profile information associated with the video content subscriber fails to match the particular subscriber profile information, the creation of the dedicated bearer, and
  where the wireless access network assigns quality of service (QoS) parameters, based on the particular subscriber profile information, to video content delivered to the fixed user device connected to the wireless access network.

3. The method of claim 2, where the wireless access network includes a Long Term Evolution (LTE) network.

4. A device comprising:
  a memory to store a plurality of instructions; and
  a processor to execute instructions in the memory to:
  receive subscriber profile information for a fixed user device when the fixed user device connects to a wireless access network,
  receive a video content request from the fixed user device,
  provide the video content request to a content provider,
  receive video content from the content provider based on the video content request,
  create, as the video content is received from the content provider, a dedicated bearer, for the fixed user device in the wireless access network, when the video content matches the subscriber profile information,
  assign, when the dedicated bearer is created, quality of service (QoS) parameters to the video content based on the traffic parameters,
  provide, to the fixed user device, the video content with the QoS parameters, and prevent creation of the dedicated bearer for the fixed user device when a packet of the video content fails to match the subscriber profile information.

* * * * *